United States Patent [19]
Hassan

[11] Patent Number: 6,079,773
[45] Date of Patent: Jun. 27, 2000

[54] SEAT COMPARTMENT

[76] Inventor: Samer Kassim Hassan, 395 Josephine Ave., Windsor, Ontario, Canada, N9B 2K9

[21] Appl. No.: 09/302,408

[22] Filed: Apr. 30, 1999

[51] Int. Cl.⁷ .................................................. A47C 7/62
[52] U.S. Cl. ................. 297/188.13; 297/188.04; 297/188.06; 297/256; 297/112
[58] Field of Search .................... 297/112, 113, 297/188.04, 188.06, 188.07, 188.05, 188.2, 188.21, 254, 256, 256.15, 250.1, 238, 487, 188.13

[56] References Cited

U.S. PATENT DOCUMENTS

| | | | |
|---|---|---|---|
| 3,094,354 | 6/1963 | Bernier | 297/188.04 X |
| 4,466,659 | 8/1984 | Carpentier et al. | 297/188.06 |
| 4,690,455 | 9/1987 | Bailey et al. | 297/188.06 X |
| 4,900,087 | 2/1990 | Crisp | 297/112 X |
| 5,005,526 | 4/1991 | Parker | 297/256 X |
| 5,490,623 | 2/1996 | McConnell | 297/188.06 X |

FOREIGN PATENT DOCUMENTS 16888 9/1894 United Kingdom .................... 297/256

*Primary Examiner*—Laurie K. Cranmer
*Attorney, Agent, or Firm*—Daryl W. Schnurr

[57] ABSTRACT

A seat pocket can be used as an integral part of a back of a seat of a motor vehicle, or alternatively, the pocket can be used as an after market item for attachment to a seat back of a seat of a motor vehicle. The seat pocket has an open position and a closed position. In an open position, the seat pocket is in the form of a container with a base, two raised sides, an inner end and an outer end. The outer end is hinged on the base as is the inner end. The sides are foldable so that the inner end can be folded down parallel to the base and the sides will automatically fold. The inner end is hinged relative to the base as well. When the seat pocket is integral with the seat back, the inner end forms part of the seat. In a closed position, an underside of the base forms an outer surface of the seat back.

8 Claims, 6 Drawing Sheets

SEAT COMPARTMENT

BACKGROUND OF THE INVENTION

Field of Invention

This invention relates to a seat pocket for use with the seat back of a motor vehicle and, more particularly, to a seat pocket that can be integral with the seat back or an accessory item.

It is known to have containers and compartments in motor vehicles and one of the most common is a compartment that is commonly referred to as the glove compartment. In most vehicles, the glove compartment has a hinged door so that the articles within the compartment can be hidden from view. It is also known to have armrests that fold into the seat back in an unused position and fold down onto the seat when in use.

When an operator of a vehicle has handheld articles upon entering the vehicle, the handheld articles are often placed on the passenger seat assuming that that seat is vacant. The operator then drives the vehicle and, as the vehicle stops and starts or proceeds around a curve, the articles left on the passenger seat sometimes will roll onto the floor. This can be very distracting to the operator and can be the cause of an accident. It can also be very frustrating and items can become dirty or damaged.

SUMMARY OF THE INVENTION

A seat pocket for use on a seatback of a motor vehicle has an open position and a closed position. The pocket has a base with an outer end and an inner end that is hingedly mounted to the base. Two foldable sides are connected between the ends and the base. One of the sides is located along each side of the base and the pocket forms a container in the open position. The container has the base with the ends and sides extending upwards therefrom. In the closed position, the pocket has said ends folded inward to a position parallel to the base with the sides being in a folded position.

DETAILED DESCRIPTION OF THE DRAWINGS

Figure 1:
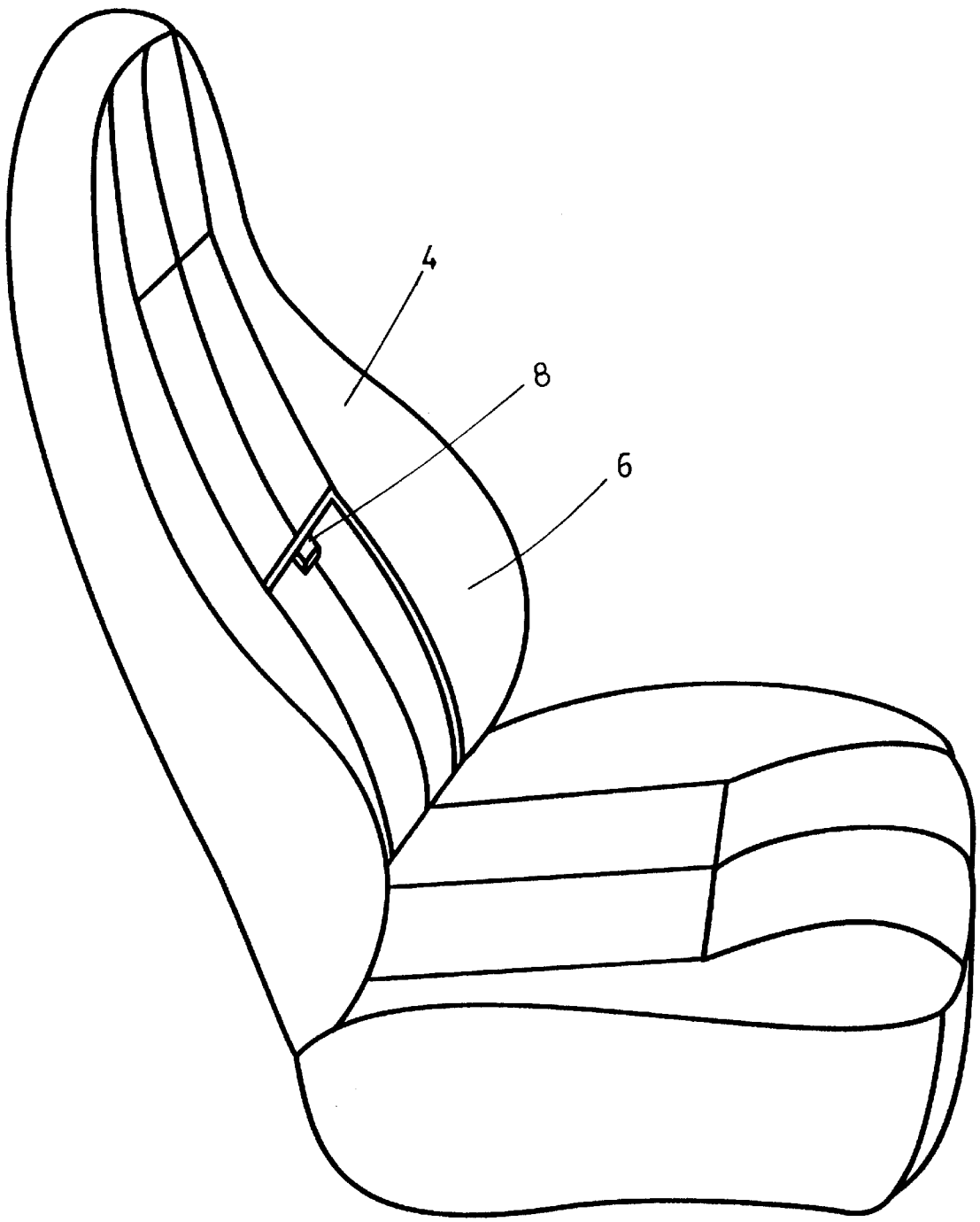
FIG. 1, there is shown a perspective view of a motor vehicle seat having a seatback and showing a seat pocket in a closed position.
Figure 2:
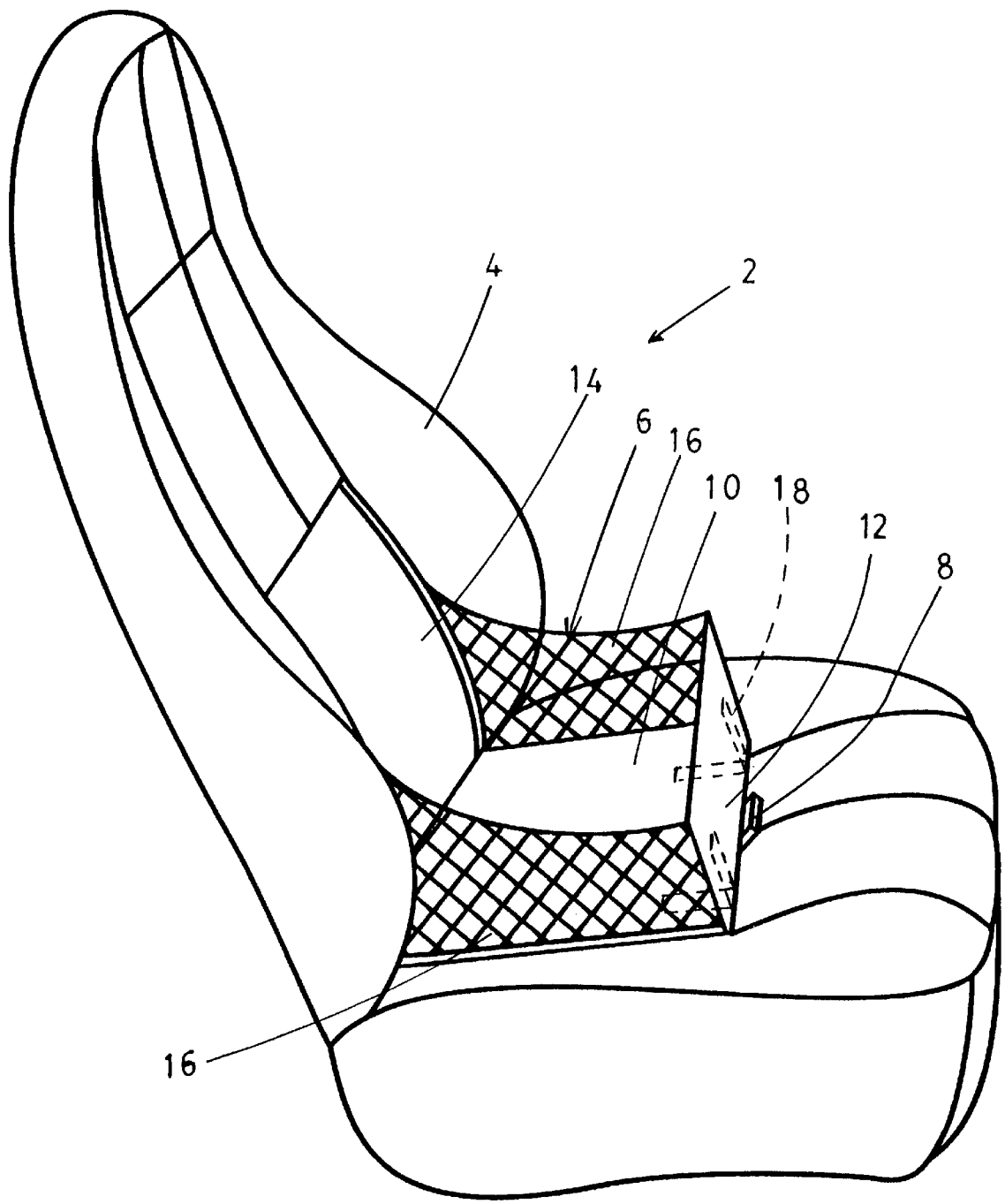
FIG. 2 is a perspective view of the motor vehicle seat of FIG. 1 with the seat pocket in an open position.

In the drawings, FIG. 1 shows a motor vehicle seat 2 having a seatback 4 with a seat pocket 6 in a closed position. The seat pocket 6 has a handle 8 protruding from the seatback 4. The seat pocket 6 is in the closed position and the handle 8 can be used to move the seat pocket to an open position as shown in FIG. 2. The same reference numerals are used in FIG. 2 to describe those components that are identical to the components of FIG. 1.

Figure 3:
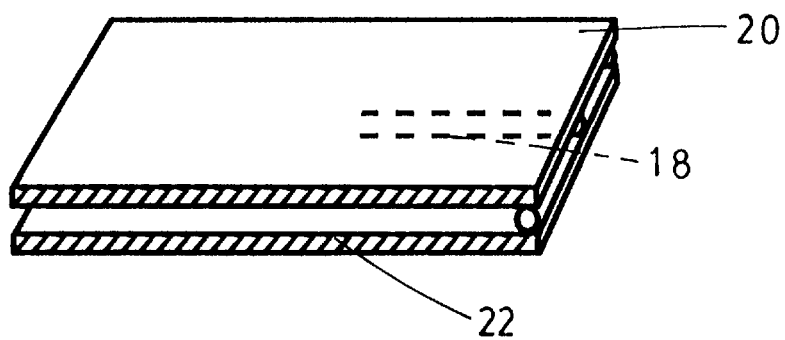
FIG. 3 is a partial perspective view of an outer end of the seat pocket in a closed position relative to a base.
Figure 4:
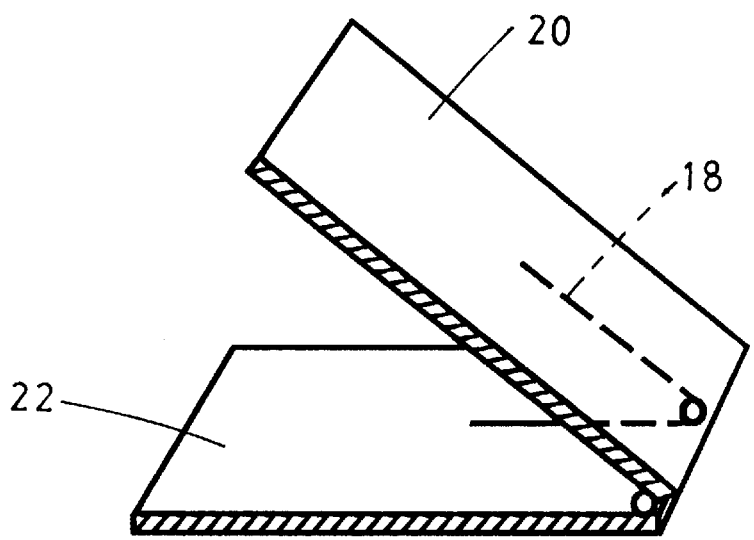
FIG. 4 is a partial perspective view of said outer end of said seat pocket in a partially open position relative to said base.

The seat pocket 6 has a base 10, an outer end 12 and an inner end 14 with two sides 16. The two sides 16 are preferably made of a mesh material. The sides can be made of any soft or otherwise foldable material. Two springs 18 are mounted between the outer end 12 and the base 10. From FIG. 1, it can be seen that when the seat pocket is in a closed position, it is virtually unnoticeable except for the handle 8. In FIGS. 3 and 4, there is shown an enlarged perspective view of one of the springs 18 that is mounted between the outer end 12 and the base 10 (not shown in FIGS. 3 and 4). The spring 18 has two sections 20, 22 that are forced apart from one another by the spring 18. In FIG. 3, the two sections 20, 22 are parallel to one another. In this position, the seat pocket 6 (not shown) would be in a closed position. In FIG. 4, the section 20 is shown to be located slightly apart from the section 22. In this position, the outer end 12 would be partially open relative to the base 10.

Figure 5:
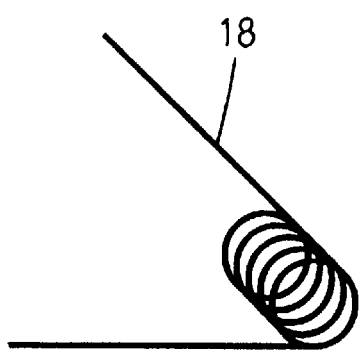
FIG. 5 is a perspective view of a spring.

In FIG. 5, there is shown an enlarged version of one of the springs 18 in a partially open position.

Figure 6:
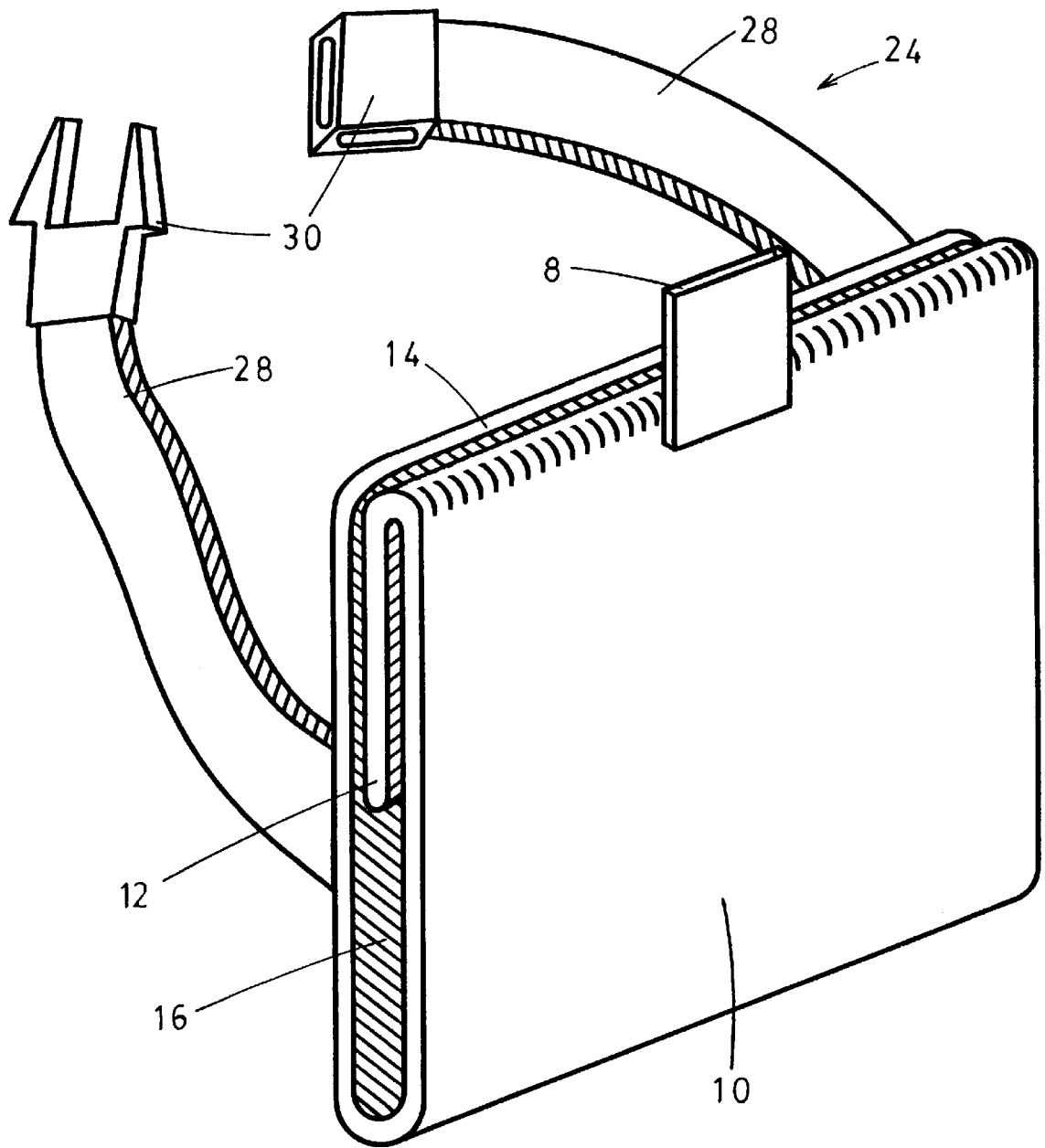
FIG. 6 is a perspective view of an accessory seat pocket in a closed position having a belt.

In FIG. 6, there is shown a seat pocket 24, which represents a further embodiment of the present invention. The same reference numerals are used in FIG. 6 to describe those components that are identical to the components of FIGS. 1 to 5. The seat pocket 24 is in a closed position with the base 10, outer end 12 and inner end 14 are parallel to one another. The sides 16, only one of which is shown in FIG. 6, are folded within the seat pocket 24. A handle 8 provides a means of opening and closing the seat pocket 24. A belt 28 extends from either side of the pocket 24 to a buckle 30. The belt 28 and buckle 30 can be used to affix the pocket 24 to the seatback by extending the belt around behind the seatback with the pocket located in front. Preferably, the belt has additional length so that it can be extended or retracted to properly fit the seatback with which it is used.

Figure 7:
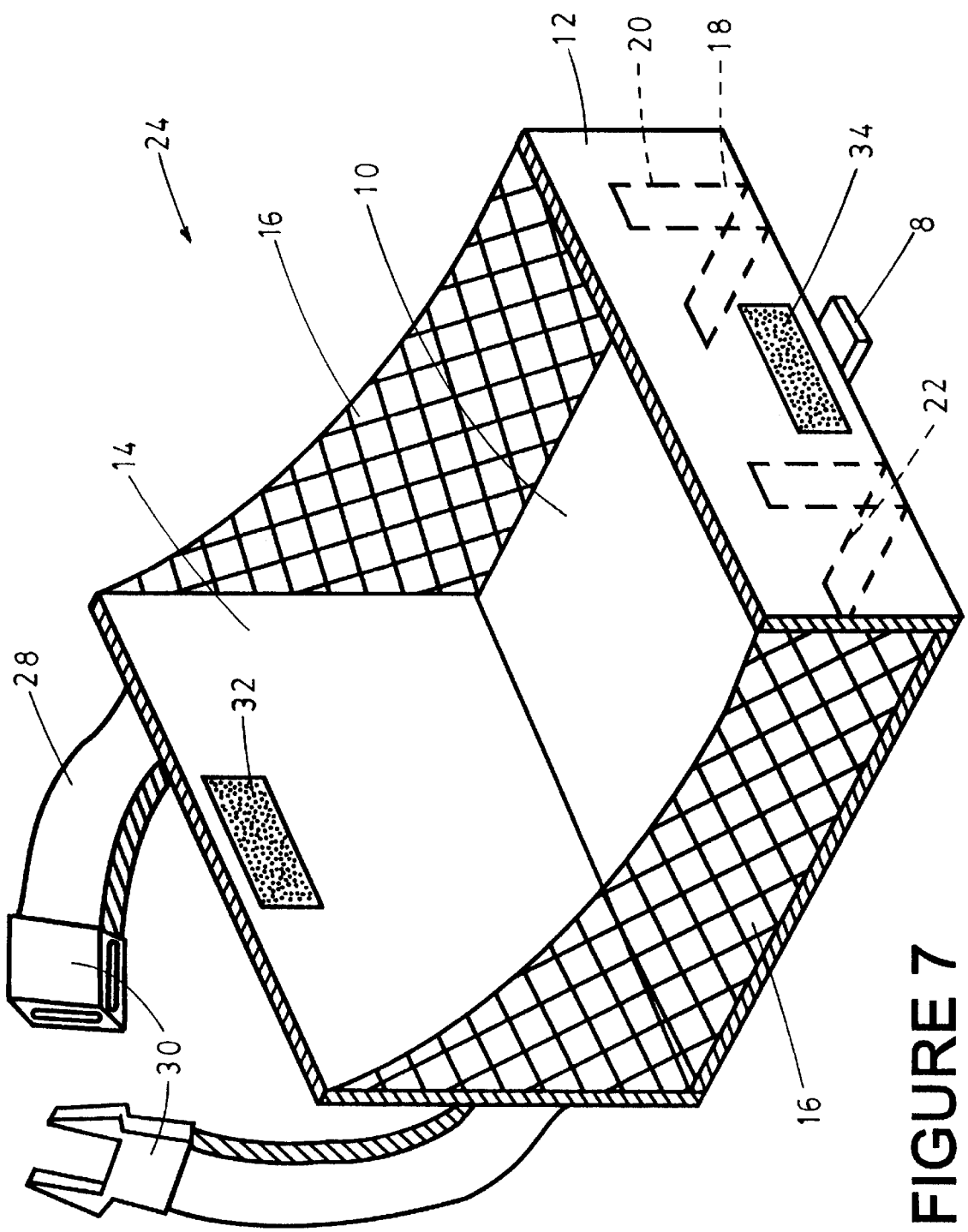
FIG. 7 is a perspective view of the seat pocket of FIG. 6 in an open position.

In FIG. 7, the seat pocket 24 is shown in an open position with the outer end 12 and inner end 14 extending upward relative to the base 10. The two sides 16 are shown in the fully extended position. On an interior surface of the inner end 14, there is located a suitable piece of velcro (a trademark) material 32. A corresponding piece of velcro material 34 is located on an exterior surface of the outer end 12. The two pieces of velcro material 32, 34 will be either hooks or loops so that when the pocket 24 is moved to a closed position, the two pieces of velcro will come together and hold the pocket in that closed position. The spring sections 20, 22 cause the outer end to move upward relative to the base 10 when the pocket 24 is opened.

Figure 8:
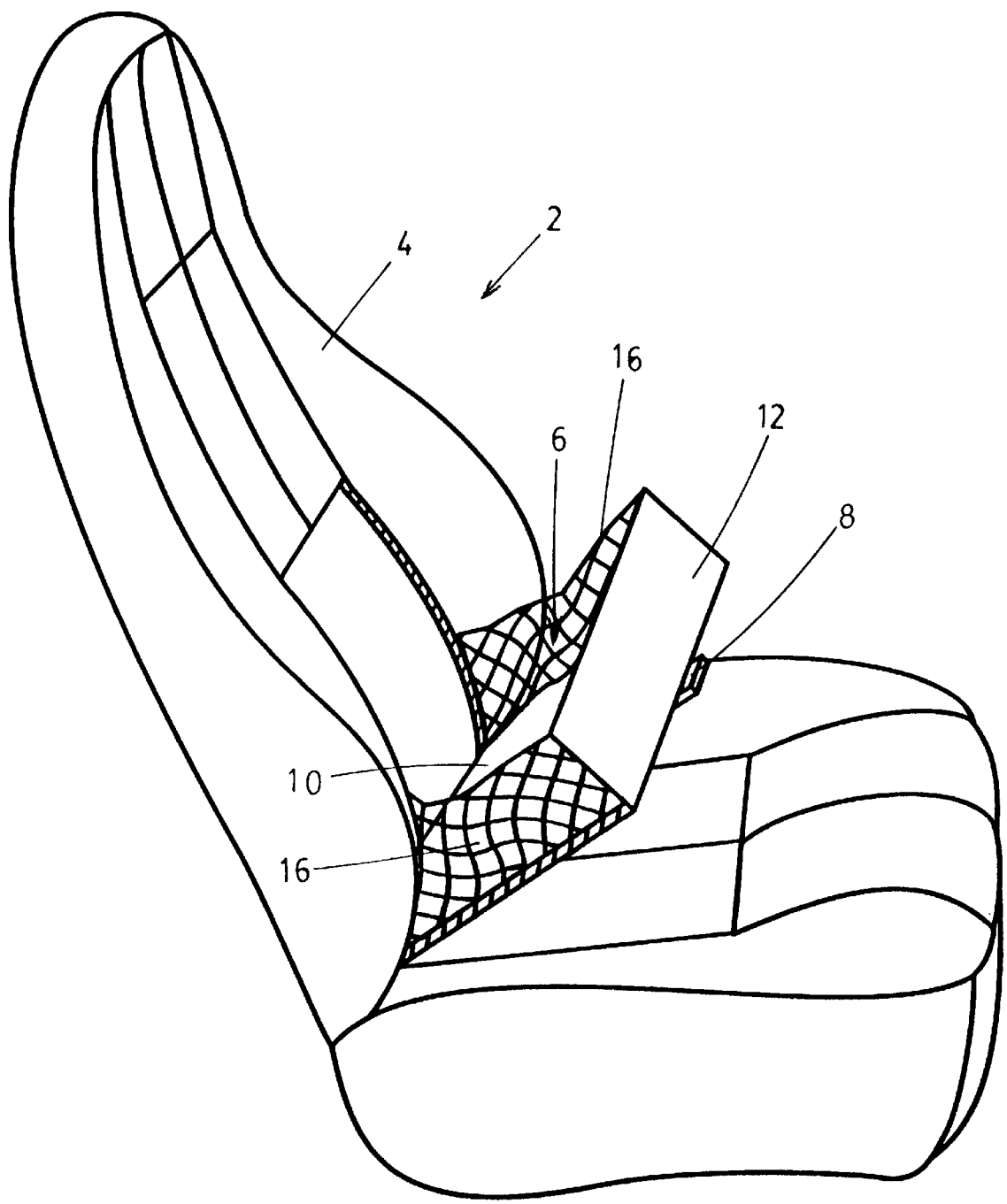
FIG. 8 is a perspective view of a motor vehicle seat having a seat pocket in a partially open position.

In FIG. 8, the seat pocket 6 is shown in a partially open position. In this position, the sides 16 are somewhat limp compared to the fully open position. The remaining components of the seat pocket 8 are described using the same reference numerals as those used in FIGS. 1 and 2.

It can be seen that the seat pocket 6 is integral with the seatback 4 and is designed to be used in new vehicle manufacture. The seat pocket 24 is an accessory item and it is designed to be used with an existing motor vehicle. Both versions fold up to a relatively compact size so that they do not interfere with the use of the seat when the pockets are in a closed position. The pockets can be designed to provide some lumbar support to the user of a seat when the pockets are in a closed position.

I claim:

1. A seat pocket for use on a seat back of a motor vehicle, said pocket having an open position and a closed position, said pocket having a base with an outer end and an inner end hingedly mounted to said base, two foldable sides connected between said ends and said base, one of said sides being located along each side of said base, said pocket forming a container in said open position, said container having said base with ends and said sides extending upwards therefrom, in said closed position said pocket having said ends folded inward to a position parallel to said base with said sides being in a folded position said outer end being spring mounted relative to said base so that said outer end springs upward relative to said base when said seat pocket is moved from said closed position to said open position.

2. A seat pocket as claimed in claim 1 wherein there are means for attaching said pocket to said seat back.

3. A seat pocket as claimed in claim 2 wherein said base is integral with said seat back.

4. A seat pocket as claimed in claim 2 wherein there is a belt having a buckle therein that can be made to extend from either side of said seat pocket around said seat back.

5. A seat pocket as claimed in claim 2 wherein there is a handle located to assist in moving the pocket between the open and closed positions.

6. A seat pocket as claimed in claim 2 wherein velcro strips are used to hold the seat pocket in a closed position.

7. seat pocket as claimed in claim 1 wherein the sides are made from a mesh material.

8. A seat pocket as claimed in claim 1 wherein the sides are made of a cloth material.

* * * * *